Figure 1:
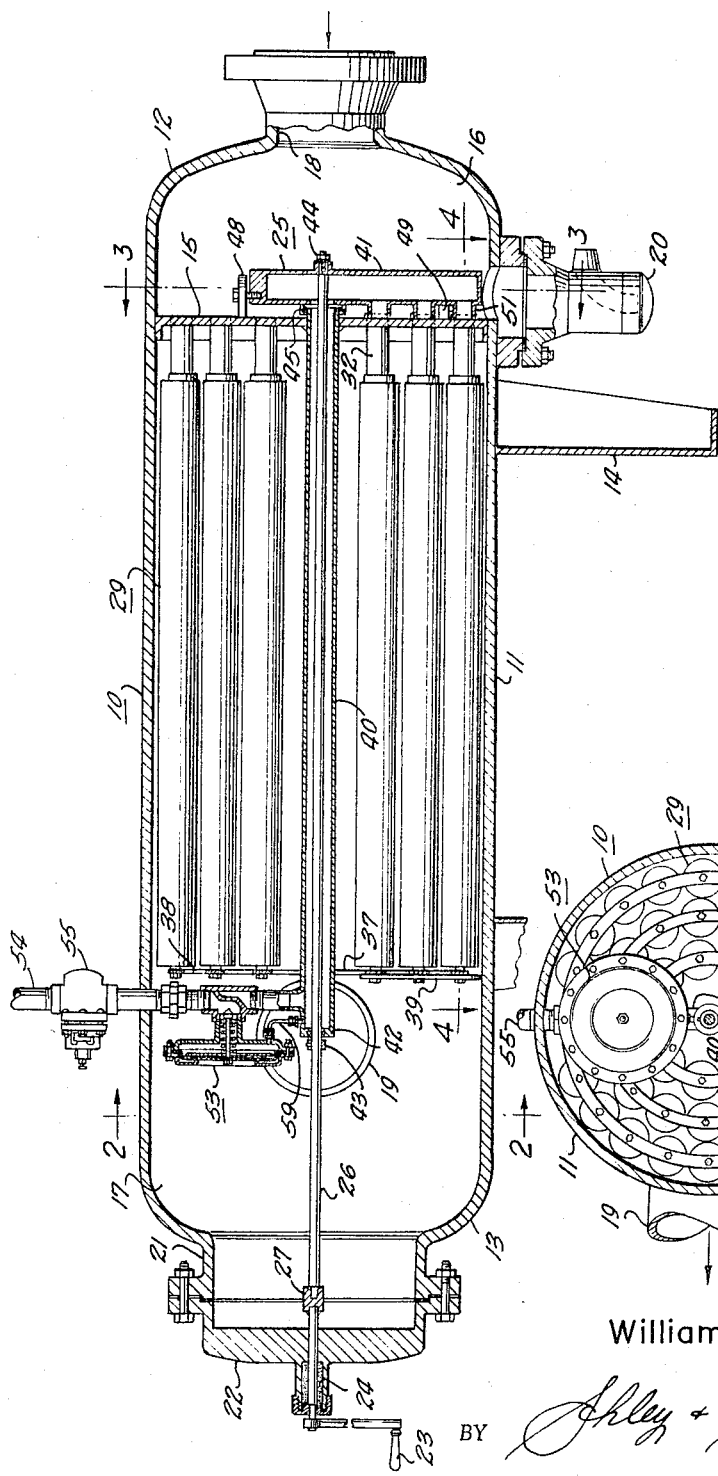

Oct. 25, 1966   W. R. KING   3,280,980
SELF-CLEANING FILTER
Original Filed Jan. 28, 1963   7 Sheets-Sheet 1

INVENTOR
William R. King
BY Ashley & Ashley
ATTORNEYS

INVENTOR
William R. King
BY *Ashley & Ashley*
ATTORNEYS

Oct. 25, 1966

W. R. KING 3,280,980

SELF-CLEANING FILTER

Original Filed Jan. 28, 1963

7 Sheets-Sheet 5

INVENTOR
William R. King

BY *Ahley & Ahley*

ATTORNEYS

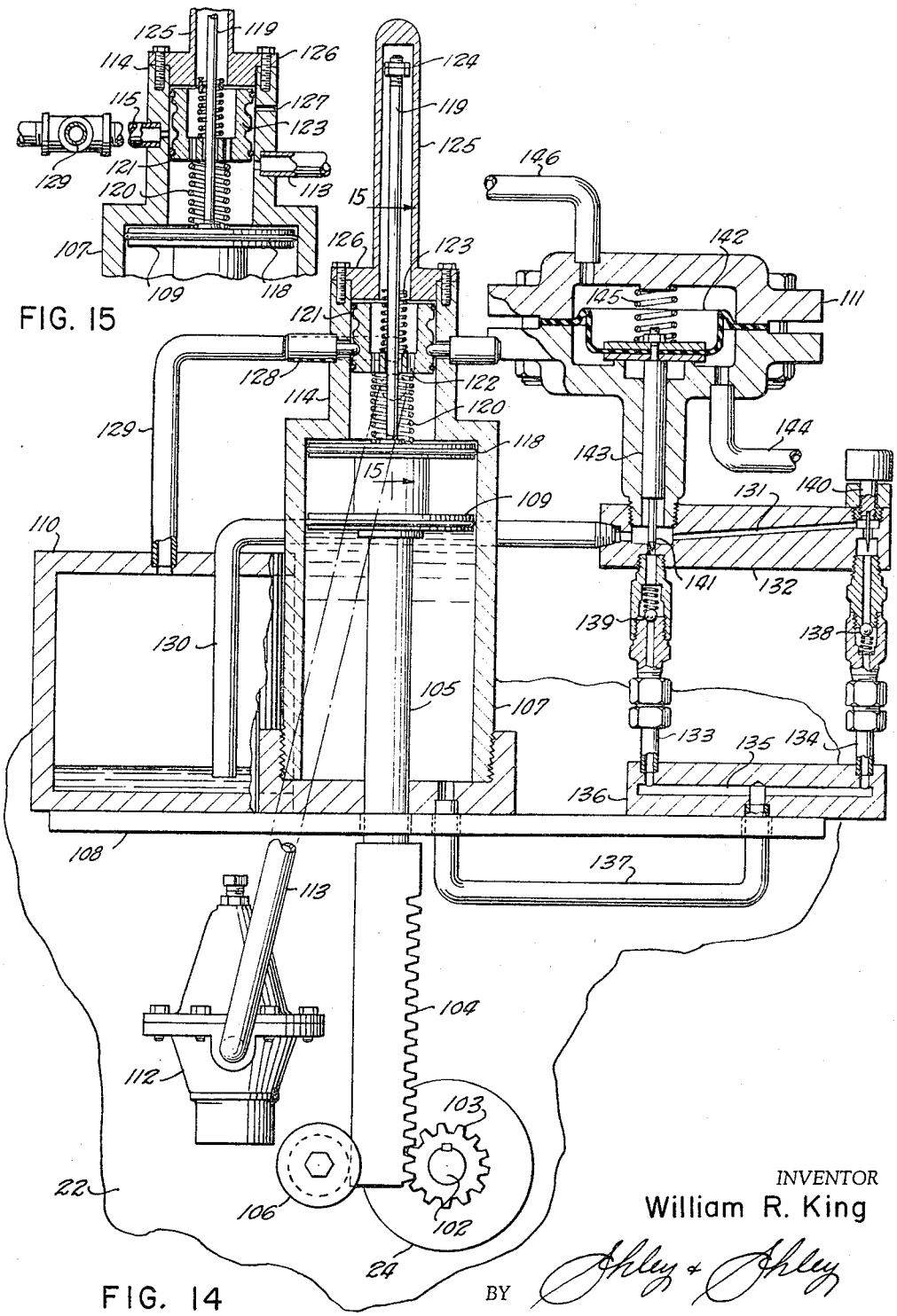

INVENTOR
William R. King
BY Ahley & Ahley
ATTORNEYS

United States Patent Office 3,280,980
Patented Oct. 25, 1966

3,280,980
SELF-CLEANING FILTER
William R. King, P.O. Box 2269, Longview, Tex.
Continuation of application Ser. No. 254,207, Jan. 28, 1963. This application Jan. 3, 1966, Ser. No. 525,793
9 Claims. (Cl. 210—108)

This application is a continuation of my copending application Ser. No. 254,207, filed Jan. 28, 1963, now abandoned.

This invention relates to new and useful improvements in self-cleaning filters.

One object of the invention is to provide an improved self-cleaning filter of the multi-element type having novel means for reversing the flow of a portion of the fluid passing therethrough and directing the reversed flow through the elements.

Another object of the invention is to provide an improved self-cleaning filter for gas and other fluids under pressure having a plurality of filter elements arranged in substantially parallel, close proximity for the passage of the fluid therethrough and cleaning means adapted to utilize the pressure of the fluid to create a reverse flow through a few elements at a time for cleaning the elements whereby the cleansing action is more efficient and interference with the operation of the filter is kept to a minimum.

An important object of the invention is to provide an improved filter, of the character described, wherein the cleaning means has a passage for discharging the reverse flow of fluid and means responsive to the differential of pressures of the fluid in the filter and the discharge passage of said cleaning means for preventing flow through said discharge passage when the presure differential becomes excessive whereby collapsing or other damaging of the filter elements is precluded, said reverse flow through said discharge passage being permitted so long as the pressure in said filter does not exceed the pressure in said passage by a predetermined amount.

Another important object of the invention is to provide a novel self-cleaning filter for gas and other fluids under pressure having inlet and outlet chambers separated by partition means with a plurality of filter elements in the outlet chamber and having inlet ends communicating with the inlet chamber through the partition means whereby fluid flowing through the vessel is forced through the filter elements, and with cleaning means mounted for rotation in said vessel and having a discharge passage for successive communication with the inlet ends of said filter elements to permit fluid from said outlet chamber to flow in a reverse direction through said elements into the discharge passage, and with a pressure differential regulator having valve means for controlling flow through said discharge passage and pressure responsive means exposed to the pressure of the fluid in said outlet chamber for imparting closing movement to the valve means and exposed to the pressure of the fluid in said passage for imparting opening movement to said valve means and means for holding said valve means open until the differential between the fluid pressures in said outlet chamber and passage exceeds a predetermined amount.

A particular object of the invention is to provide an improved filter, of the character described, wherein the cleaning means is mounted for rotation about an axis in a plane transverse to the inlet ends of elongate filter elements and has a plurality of openings movable through concentric arcs about the axis for successive registration with said inlet ends upon rotation of said cleaning means whereby said elements may be disposed as compactly as practicable in the arcs of movement of the openings of said cleaning means so as to increase the capacity of the filter and need not be maintained in radial alinement.

A further object of the invention is to provide an improved filter, of the character described, wherein the cleaning means has a member extending laterally from the axis of rotation of said means and in which the openings are spaced longitudinally for successive registration with the inlet ends of the filter elements to establish communication between said inlet ends and the discharge passage, the member having means associated with the openings for minimizing the bypass of fluid from the inlet portion of the filter into said member through openings partially registered with said inlet ends.

An object of the invention is to provide an improved filter, of the character described, wherein the cleaning means may be automatic in operation in response to a predetermined differential between the inlet and outlet pressures of the filter.

A further object of the invention is to provide an improved filter, of the character described, wherein the pressure of the fluid flowing therethrough may be utilized to operate the cleaning means.

A construction designed to carry out the invention will be hereinafter described, together with other features of the invention.

Figure 2:
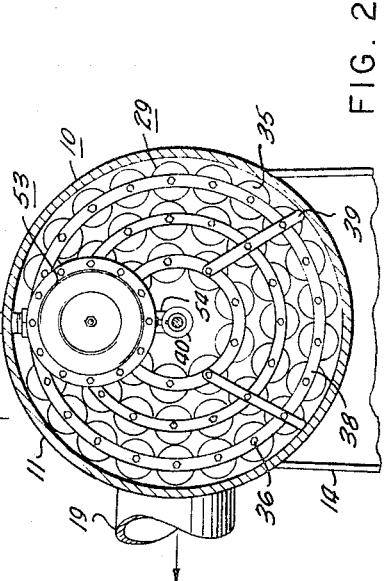
Figure 3:
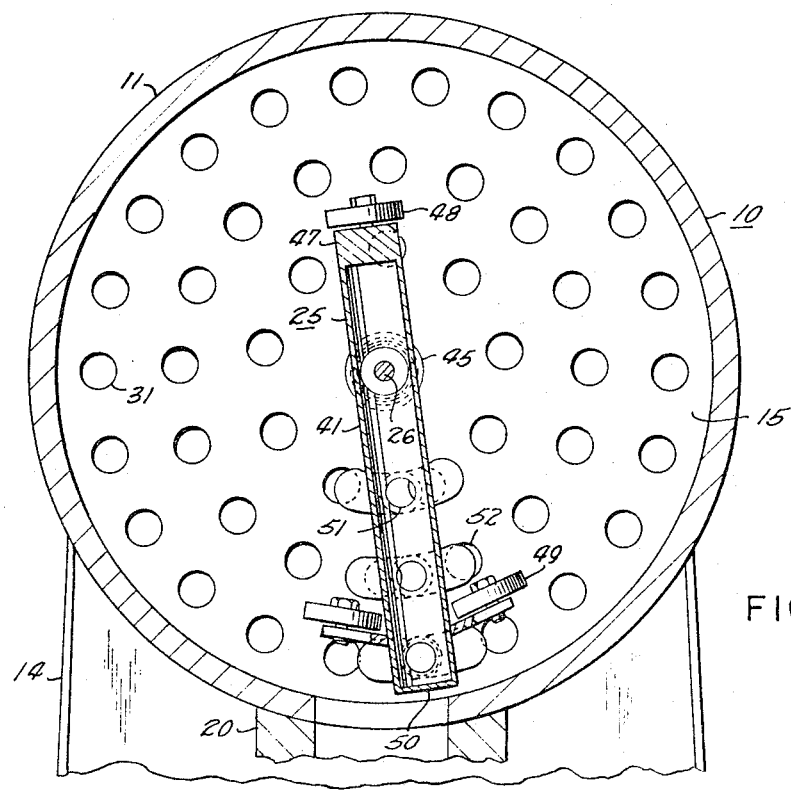
Figure 4:
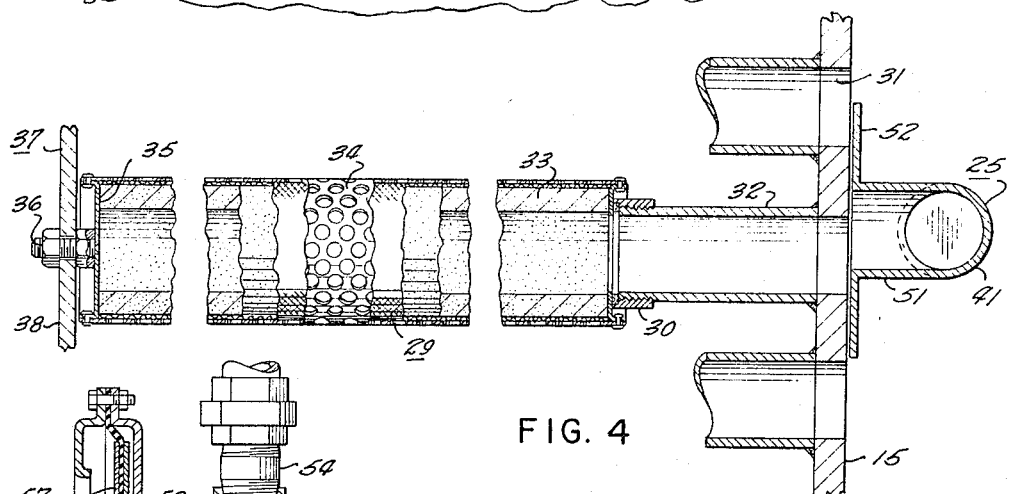
Figure 5:
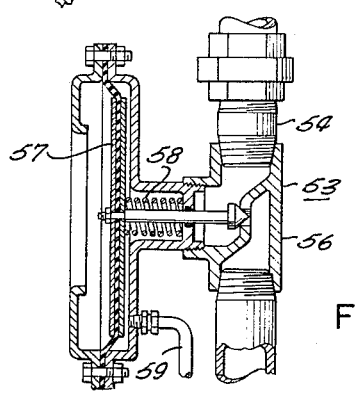
Figures 6, 12:
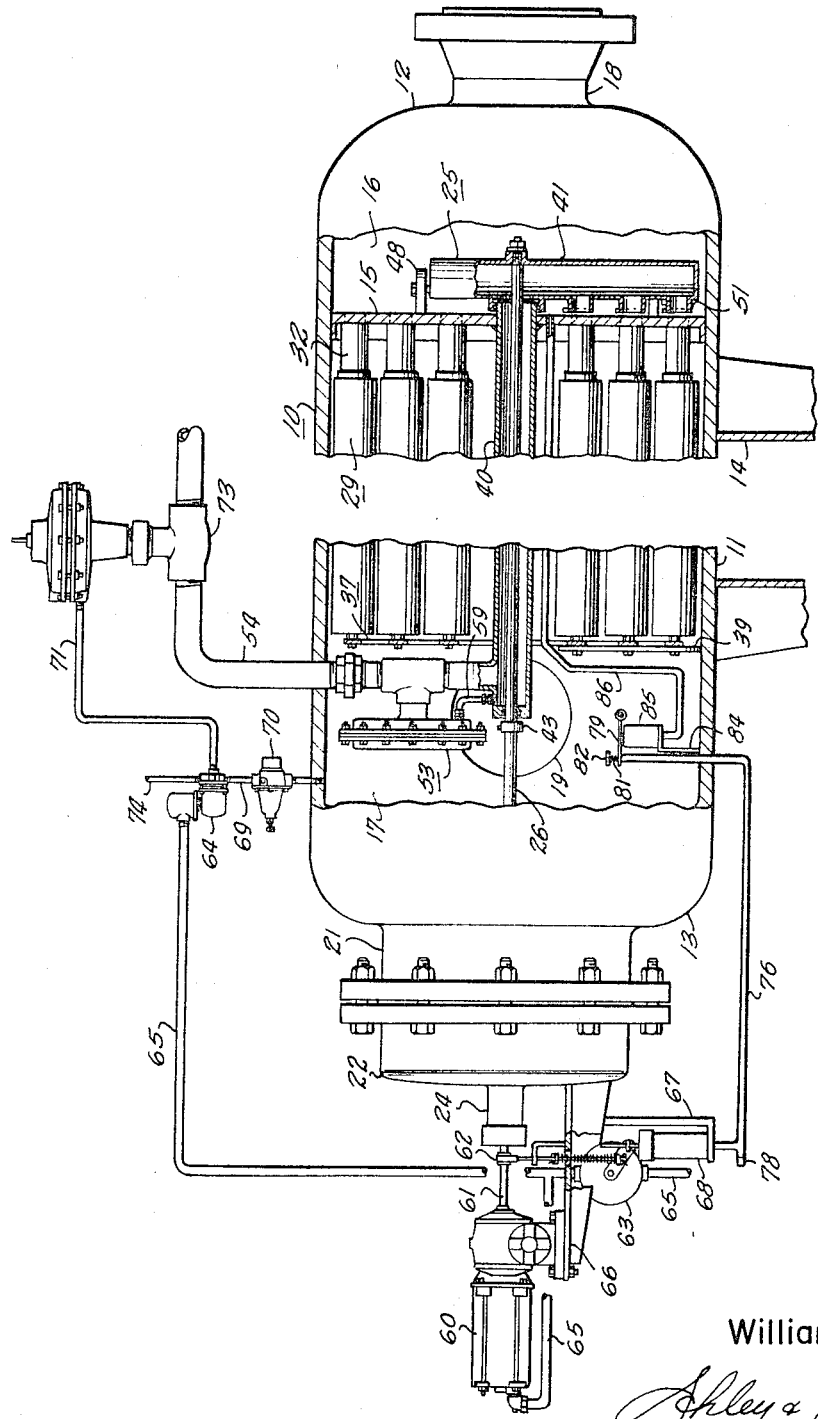
Figures 7, 9:
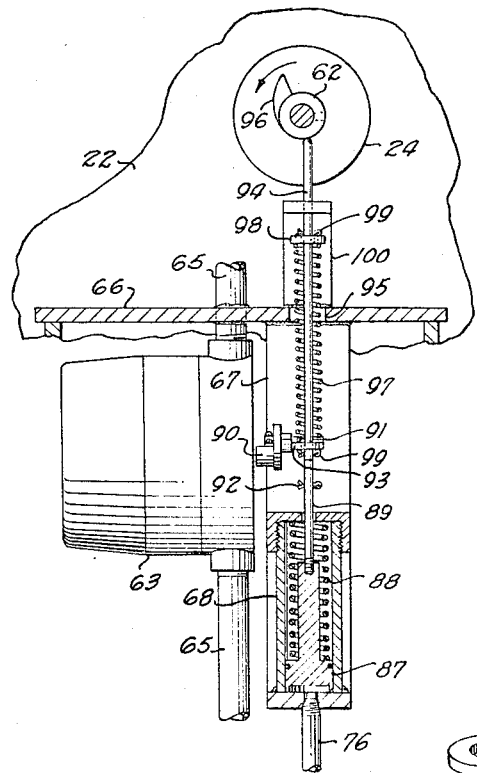
Figure 8:
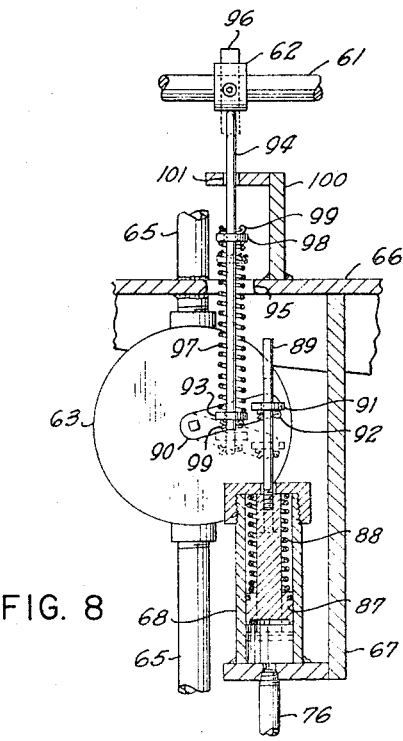
Figure 10:
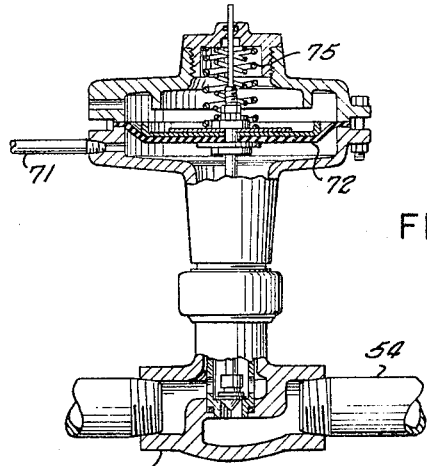
Figure 11:
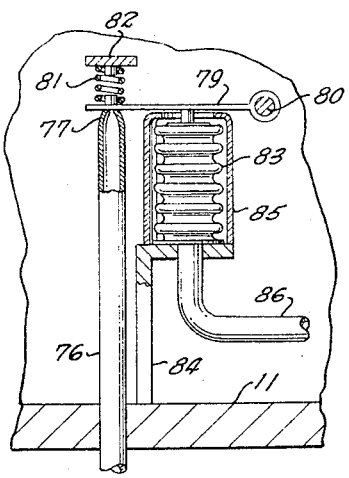
Figure 13:
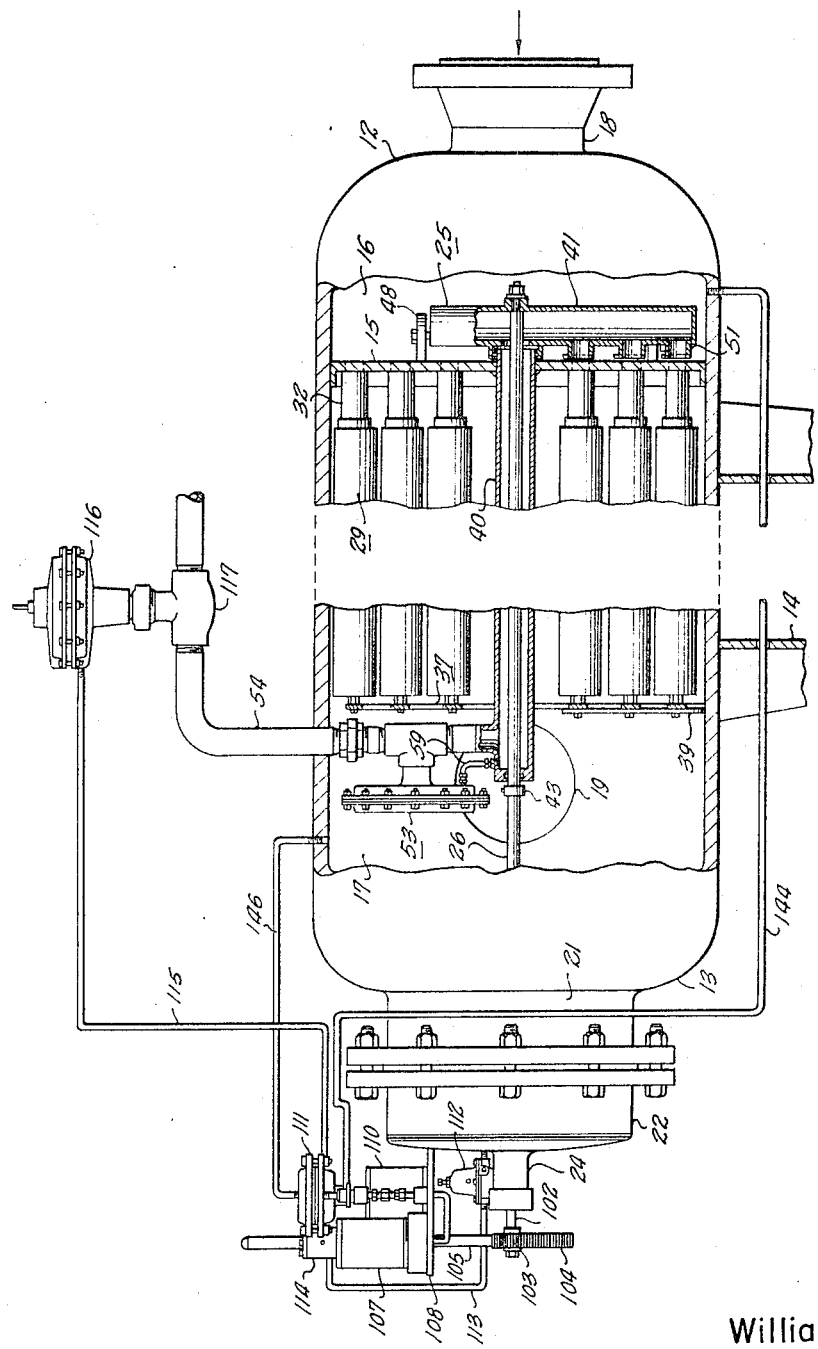
Figure 16:
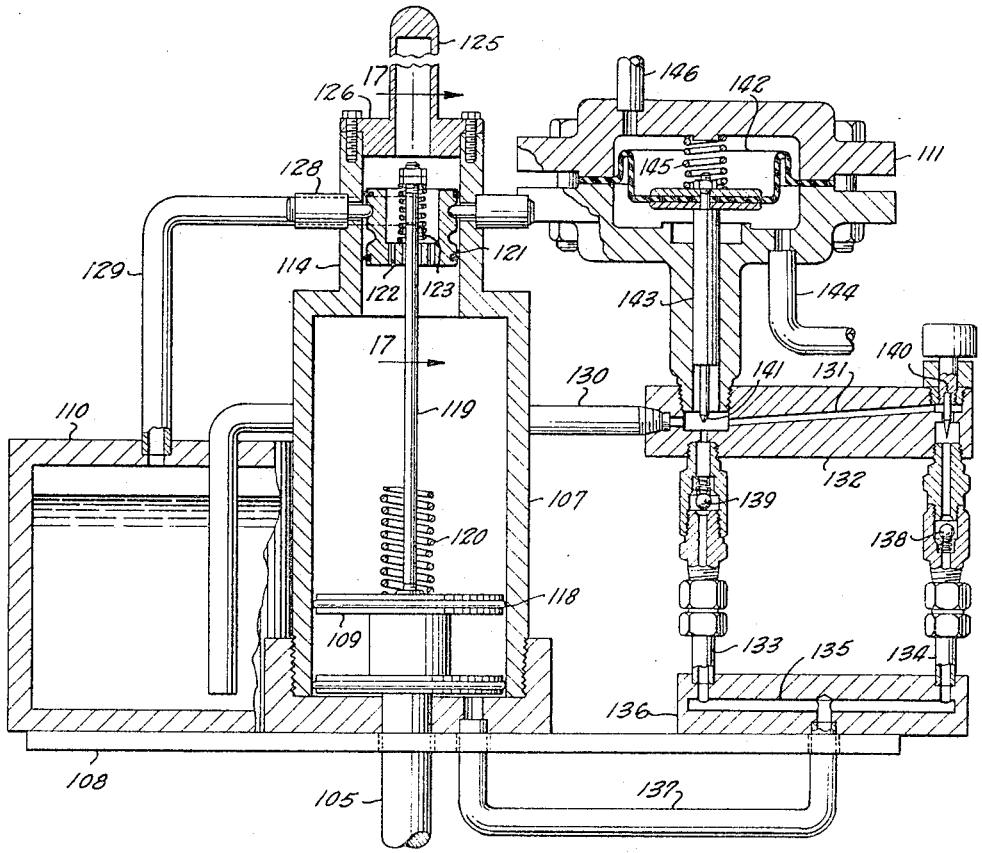
Figure 18:
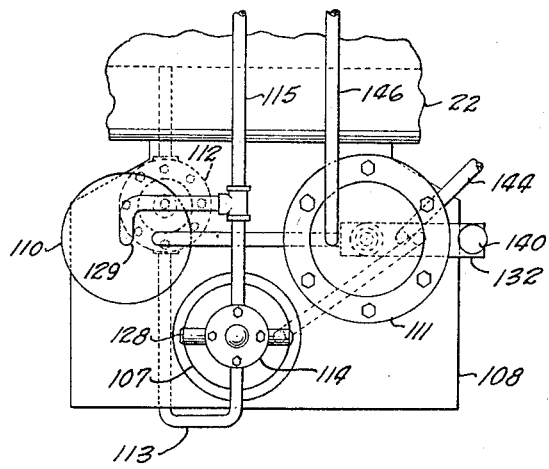
Figure 17:
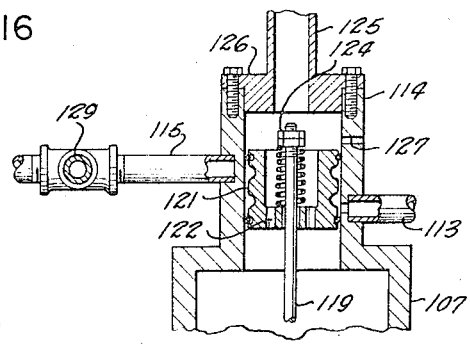

The invention will be more readily understood from a reading of the following specification and by reference to the accompanying drawings, wherein examples of the invention are shown, and wherein:

FIG. 1 is a longitudinal, vertical, sectional view of a self-cleaning pressure fluid filter constructed in accordance with the invention, FIG. 2 is a transverse, vertical, sectional view, taken on the line 2—2 of FIG. 1, FIG. 3 is an enlarged, transverse, vertical, sectional view, taken on the line 3—3 of FIG. 1, showing the arm of the cleaning means, FIG. 4 is an enlarged, broken, longitudinal, sectional view, taken on the line 4—4 of FIG. 1, showing the mounting of one of the filter elements and its relation to the cleaning arm, FIG. 5 is a enlarged, sectional view of the differential pressure regulator for preventing reverse flow through the discharge passage of the cleaning means when the pressure differential becomes excessive, FIG. 6 is a broken, elevational view, partly in section, of a modified fluid filter having automatically operated cleaning means, FIG. 7 is an enlarged transverse, vertical sectional view, taken at a right angle to FIG. 6, showing an operative position of the means for controlling the actuation of the means for automatically operating the cleaning means, FIG. 8 is a view, similar to and taken at a right angle to FIG. 7, showing the operative position of the actuating means in full lines and its inoperative position in broken lines, FIG. 9 is an enlarged, perspective view of one of the rod guides, FIG. 10 is an enlarged, sectional view, partly in elevation of the pressure-responsive valve for controlling flow through the discharge passage of the automatic cleaning means, FIG. 11 is an enlarged, sectional view of the differential pressure regulator for controlling the supply of pressure fluid to the actuating means, FIG. 12 is an enlarged, sectional view showing the vent of the pressure fluid supply line, FIG. 13 is a view, similar to FIG. 6, of another modified fluid filter having fluid operating cleaning means, FIG. 14 is an enlarged, vertical, sectional view showing the fluid means for automatically operating the cleaning means in its inoperative position, FIG. 15 is a transverse, vertical, sectional view, taken on the line 15—15 of FIG. 14, FIG. 16 is a view, similar to FIG. 14, showing the fluid means in an operative position, FIG. 17 is a transverse, vertical, sectional view, taken on the line 17—17 of FIG. 16, and FIG. 18 is a plan view of the fluid means.

In the drawings, the numeral 10 designates the elongate vessel of a filter for gas and other fluids under pressure which may have a cylindrical side wall 11 and dished end walls 12 and 13. The vessel is adapted to be supported in a substantially horizontal position by upright legs 14 which depend from the side wall 11, but it is noted that this position is not essential to the invention. An upright, partition or plate 15 extends transversely of the vessel adjacent its end wall 12 to divide the interior of said vessel into a relatively small or short inlet chamber 16 and a relatively large or long outlet chamber 17, the inlet chamber having an axial inlet 18 in said end wall for receiving pressure fluid from a source (not shown and the outlet chamber having a suitable outlet 19 in the side wall adjacent the other end wall 13. Also, the inlet chamber 16 may have a conventional trap and cleanout 20, depending from the side wall adjacent the partition 15 for catching dirt, dust and other foreign matter which drops out of the fluid. A flanged neck or collar 21, of relatively large diameter, projects axially from the end wall 13 and has a cover plate or head 22 removably fastened thereto and rotatably supporting a crank 23 which is journaled in an external stuffing box 24. As will be explained the crank 23 is adapted to operate reverse flow cleaning means 25 and extends through the collar 21 into the outlet chamber 17 for detachable connection at 27 with the shaft 26 of the cleaning means.

A plurality of elongate, cylindrical filter elements 29 extends longitudinally of the outlet chamber 17 between the partition 15 and outlet 19 and have inlet ends 30, in the form of collars, communicating with the inlet chamber 16 through circular openings 31 in said partition (FIG. 4). As shown in FIG. 3, the openings are disposed in concentric circles about the longitudinal axis of the vessel. Each opening 31 is surrounded by a nipple 32 projecting into the outlet chamber and having the inlet ends 30 of one of the filter elements 29 screwthreaded thereon or otherwise detachably connected thereto. The filter elements are of more or less conventional construction and include tubular cores or tubes 33 of suitable porous material and enclosed in perforated, metallic cases or shells 34 to which the inlet ends are fixed. Closure plates 35 are secured to the opposite ends of the shells 34 so as to overlie and close the outlet or downstream ends of the filter elements whereby the fluid flowing from the inlet 18 of the vessel to its outlet 19 is forced to pass edgewise through said elements.

The closure plates 35 have mounting studs and nuts 36 projecting axially outward therefrom for removably fastening the elements 29 to an upright supporting member or bracket 37 extending transversely of the outlet chamber adjacent its outlet. Although subject to variation, preferably, the bracket 37 includes a plurality of concentric annular bars or rings 38, having radii complementary to the radii of the circles of openings 31 of the partition 15, connected in spaced relation to one another by the studs and nuts 36 and flat, transverse bars or straps 39 which also support and space the rings as well as the outlet ends of the filter elements from the side wall 11 (FIG. 2). This concentric relationship, particularly, the concentricity of the circles of openings and inlet ends of the elements permits said elements to be arranged in close proximity to one another and thereby increase the capacity of the vessel. Thus, the openings and inlet ends of one circle need not be in radial alinement with the openings and inlet ends of the other circles. If desired, the filter elements 29 may occupy only one-half or a portion of the transverse area of the vessel so as to provide space for other conventional filter means. In this event, the inlet ends 30 of the elements and openings 31 of the partition would be disposed in concentric arcs and the bars 38 may be arcuate rather than circular.

The shaft 26 of the cleaning means 25 extends throughout the longitudinal axis of the outlet chamber 17 within an elongate concentric sleeve 40, and said shaft and sleeve project through the partition 15 into the inlet chamber 16 for supporting connection with a transverse, hollow member or arm 41. A thick end wall or block 42 closes the downstream or outlet end of the sleeve 40 and has the shaft journaled therein. The shaft may have a stop collar 43 mounted thereon adjacent the block 42 to limit longitudinal movement of said shaft in coaction with the transverse arm 41. The shaft 26 projects from the upstream or inlet end of the sleeve 40 transversely through the arm and is suitably secured thereto as shown at 44, whereby said arm is rotatable with said shaft. A circular collar or nipple 45 projects laterally from the intermediate portion of the arm 41 in alined communication with the sleeve 40 and is journaled on the projecting end of said sleeve.

One end portion of the arm extends radially from the shaft a relatively short distance and has a thick end wall or block 47 on which a roller 48 is rotatably mounted in parallel, overlying relationship for engagement with the partition to support said end portion of said arm. Similar rollers 49 support the opposite end portion of the arm 41, and like the roller 48 are mounted for engagement with the partition 15 between its circles of openings 31. The opposite end portion of the arm is of much greater length, extending nearly to the side wall 11, and has an end closure 50. Nipples 51, complementary to the partition openings, are spaced longitudinally of the longer end portion of the arm 41 and project laterally therefrom toward and in close proximity to the partition for successive registration with said openings upon rotation of said arm. The radial distances of the nipples 51 from the longitudinal axis of the vessel are equal to the radii of the concentric circles of openings 31 so that annular paths of movement of said nipples coincide with said concentric circles. In order to minimize the bypassing of fluid from the inlet chamber 16 into the arm, around and through nipples partially registered with the partition openings, a flat pad 52 projects laterally from each side of each nipple in contiguous, parallel relation to the partition so as to overlie and close the partially registered openings (FIGS. 3 and 4) upon rotation of said arm.

Gas or other fluid under pressure to be filtered enters the inlet chamber 16 of the vessel through the inlet 18 and flows through the openings 31 of the partition 15 into the inlet ends 30 of the filter elements 29. Since the downstream ends of the filter elements are closed, the fluid passes edgewise through said elements into the outlet chamber 17 whereby dust, dirt and other foreign matter is trapped and removed from the fluid. From the outlet chamber, the filtered fluid flows through the outlet 19. The foreign matter separated from the fluid adheres to the inner surfaces of the porous cores 33 and builds up until said cores become clogged, gradually restricting and ultimately stopping flow therethrough. Consequently, it is necessary to periodically replace the filter elements or to cleanse the same by reversing the flow of fluid therethrough. The cleaning means 25 permits this reverse flow without the necessity of ceasing operation of the filter since the nipples 51 of the arm 41 communicate through the partition openings with the inlet ends of all of the filter elements upon rotation of said arm by the crank 23 and shaft 26.

A discharge passage for accommodating the reverse flow of fluid is provided by the sleeve 40 and the interior of the hollow arm 41. The downstream end of the sleeve has a differential pressure regulator 53 connected thereto by a lateral discharge conductor or pipe 54 which projects through the side wall 11 to atmosphere or other point of disposal (not shown). A suitable shut-off valve 55 is mounted in the discharge pipe 54 externally of the vessel and is opened when it is desired to operate the cleaning means. The differential pressure regulator 53 may be disposed within the outlet chamber 17 and, as shown most clearly in FIG. 5, includes a valve 56 for controlling flow through the discharge passage and a spring-pressed diaphragm 57 for opening and closing the valve; however, said regulator may be mounted externally of the vessel 10 so long as it is exposed to the pressure of the fluid in said outlet chamber so as to be responsive thereto. A helical spring 58 constantly urges the diaphragm outwardly and the valve 56 to an open position and is aided by the pressure of the fluid in the discharge passage of the cleaning means, the inner side of said diaphragm being exposed to said pressure by a fluid conductor 59 which communicates with the sleeve 40 irrespective of whether the regulator is mounted internally or externally of the vessel.

The outer side of the diaphragm 57 communicates with the outlet chamber 17 and is exposed to the pressure of the fluid therein, whereby the valve 56 is held closed to prevent reverse flow through the discharge passage and filter elements 29 when the fluid pressure in said outlet chamber exceeds the fluid pressure in said discharge passage by a predetermined amount or by the force of the spring 58 so as to prevent collapsing or other damaging of said elements by an excessive pressure differential. In other words, the force of the spring determines the pressure differential required to close the valve. Manifestly, the valve 56 remains closed until the pressure differential between the outlet chamber and discharge passage is in proper balance.

It is readily apparent that the valve remains opens or partially open until the pressure differential becomes excessive since the inner and outer sides of the diaphragm are of equal area (FIG. 5) and the force of the spring coacts with the pressure in the discharge passage, which is exerted against said inner side of said diaphragm, to impart opening movement to said valve. In other words, the force of the spring 58 determines the pressure differential required to close the valve 56 and said valve opens, even after closing as shown in FIG. 5, whenever said pressure differential is not excessive. Since the filter elements are not in radial alinement (FIG. 2) and since said elements may occupy only a portion of the transverse area of the vessel, the nipples 51 of the cleaning arm 41 do not constantly communicate with the same number of elements and may not communicate with any elements. Consequently, the vloume of reverse flow through the discharge passage varies and causes variation of the pressure therein whereby the valve is subjected to opening and closing movement due to the differential between said pressure and the pressure in the outlet chamber.

When the cores 33 of the filter elements 29 become clogged, the shut-off valve 55 is opened and the arm 41 of the claiming means 25 is rotated into communication with one or more of said elements to permit the reverse flow of fluid from the outlet chamber 17 inwardly edgewise into said communicating elements and through the discharge passage (sleeve 40) and pipe 54 and valves 56 and 55 to the atmosphere. Since the filter elements in communication with the discharge passage through the nipples 51 of the arm are out of communication with the inlet chamber 16, said elements are not exposed to the pressure of the fluid in said inlet chamber and reverse flow from the outlet chamber is permitted. The pressure regulator 53 is adapted to prevent this reverse flow when the pressure in the outlet chamber exceeds the pressure in the discharge chamber by a predetermined amount, i.e., the force of the spring 58, so as to prevent collapsing or other damaging of the filter elements 99 communicating with said passage by an excessive pressure differential. Due to the force of the spring urging the valve 56 to an open position, the fluid pressure in the outlet chamber 17 forces the diaphragm 57 inwardly to impart closing movement to said valve when the differential between said pressure and the fluid pressure in the discharge passage exceeds a predetermined amount or the force of said spring. Whenever the discharge passage is supplied with fluid pressure sufficient with the force of the spring 58 to overcome the force of the fluid pressure in the outlet chamber 17 exerted against the outer side of the diaphragm, opening movement is imparted to the valve 56 so as to permit reverse flow from said outlet chamber through said discharge passage.

Upon completion of the cleansing of the filter elements, the shut-off valve 55 is closed to stop flow through the discharge passage and reverse flow through said elements. When the shut-off valve is closed, the valve 56 is held open by the force of the spring and the pressure of the fluid in the inlet chamber 16 entering the discharge passage through the nipples 51 of the arm 41 and flowing through the sleeve 40 and conductor 59 to the inner side of the diaphragm and overcoming the force of the pressure fluid in the outlet chamber 17 exerted against the outer side of said diaphragm. Due to the removability of the head 22, the filter elements may be removed and replaced through the neck 21 upon disassembly of the bracket 37.

As shown in FIGS. 6–12, the cleaning means 25 may be operated automatically in response to a predetermined differential of pressures of the fluid in the inlet and outlet chambers 16 and 17. This pressure differential occurs when the filter elements 29 become clogged and cause the pressure of the fluid in the inlet chamber to exceed the pressure of the fluid in the outlet chamber by a predetermined amount. In place of the crank 23, an electric gearmotor 60 is detachably connected to the shaft 26 of the cleaning means by a stub shaft 61 extending through and journaled in the stuffing box 24 of the head 22 (FIG. 6). The stub shaft 61 carries a cam 62 for actuating an electric switch 63 which is electrically connected to the gearmotor 60 and to a solenoid valve 64 as well as to a source of electrical current (not shown) by suitable electrical conductors 65. A horizontal platform or shelf 66 projects from the head 22 for supporting the gearmotor and switch and may have an angular bracket 67 depending therefrom to support an upright pressure fluid cylinder 68.

The solenoid valve 64 is of the conventional three-way type and communicates with the outlet chamber 17 through a fluid conductor 69 in which a pressure regulator 70 is mounted. From the solenoid valve, the pressure fluid is directed through another conductor 71 to the inner side of a spring-pressed diaphragm 72 (FIG. 10) of a motor valve 73 connected in the discharge pipe 54 externally of the vessel 10 in place of the shut-off valve 55 for controlling flow through the discharge passage of the cleaning means 25. A suitable vent 74 may extend from the solenoid valve 64 to permit the exhaust of pressure fluid from the inner side of the diaphragm 72 and the closing of the motor valve 73 by the inward flexing of said diaphragm due to the force of a helical spring 75 which bears against its outer side.

For supplying pressure fluid from the outlet chamber to the cylinder 68, a conductor 76 has its inner end extending into said chamber through the side wall 11 of the vessel and its outer end through the bracket 67 into communication with the lower end of said cylinder. The conductor 76 has a reduced inlet end or orifice 77 (FIG. 11) and a vent 78 (FIG. 12) adjacent its connection to the cylinder. A flat valve element or plate 79 overlies and closes the orifice 77, being pivotally supported by a rod 80 which extends transversely within the vessel. The valve plate 79 is urged into engagement with the orifice by an overlying, helical spring 81 and a confining bar or member 82 (FIG. 11). A bellows or pressure-responsive member 83 underlies the valve plate between its pivot rod 80 and the orifice 77 for lifting or unseating said valve plate and may be mounted on a bracket 84 within a suitable housing 85 which communicates with the outlet chamber 17 so as to expose the exterior of the bellows to the pressure fluid in said chamber. The interior of the bellows 83 communicates with the inlet chamber 16 through a fluid conductor 86 extending from the lower end of said bellows through the bracket 84 and the longitudinal axial portion of the outlet chamber and the partition 15 (FIG. 6). When the pressure fluid in the inlet chamber exceeds the combined force of the spring 81 and the pressure fluid in the outlet chamber due to clogging of the filter elements 29, the bellows is expanded or elongated so as to unseat the valve plate and permit said outlet pressure fluid to enter the conductor 76 through its orifice and flow to the cylinder 68. Thus, the valve plate, spring 81 and bellows 83 coact to provide a differential pressure regulator.

As shown in FIGS. 7 and 8, a piston 87 is slidably mounted in the cylinder 68 and is constantly urged downwardly by an overlying helical spring 88 confined within said cylinder. The piston 87 has an axial rod 89 upstanding therefrom and projecting through the upper end of the cylinder for loose connection with the pivoted actuating arm 90 of the switch 63. An annular swivel guide 91 (FIG. 9) is mounted on the outer end portion of the switch actuating arm to slidably receive the upper portion of the piston rod 89 which carries a cotter pin or other enlargement 92 below the guide for engaging said guide and pivoting said arm upwardly from its off to its on position upon upward movement of said rod with the piston. This loose connection permits downward movement of the piston and rod relative to the switch arm 90. A similar guide 93 is swiveled on the intermediate portion of the switch arm for slidably receiving the lower portion of an upright, cam rod 94 having its upper portion extending through an opening 95 in the shelf 66 into alined proximity to the cam 62 of the stub shaft 61. The cam is circular except for its lobe 96 that is adapted to engage and depress the cam rod 94 upon rotation of the stub shaft. A helical spring 97 is confined upon the medial portion of the cam rod above the swivel guide 93 and below a ring 98, and cotter pins or other enlargements 99 on said rod overlie and underlie the ring and guide, respectively, to slidably support said rod and permit downward movement thereof relative to the switch arm 90. It is noted that the size of the shelf opening 95 is sufficient to permit the spring 97 to extend therethrough. For maintaining the cam rod 94 in its upright position, an angular bracket 100 upstands from the shelf and has the upper end portion of said rod projecting through an opening 101 therein.

When the pressure differential between the inlet and outlet chambers 16 and 17 exceeds a predetermined setting of the spring 81, the greater pressure of the fluid in said inlet chamber unseats the valve plate 79 and permits pressure fluid in the outlet chamber to flow to the cylinder 68 through the conductor 76. As shown in FIG. 8, the piston 87 and its rod 89 are raised by this pressure fluid to pivot the switch arm 90 upwardly from its off to its on position and thereby close the switch 63 for directing electric current to the gearmotor 60 and solenoid valve 64. Due to the pressure fluid in the conductor 69, the motor valve 73 is opened when the solenoid valve is actuated to permit said fluid to flow through the conductor 71 to the underside of the diaphragm 73 so as to overcome the force of the spring 75 of said motor valve. This opens the discharge passage of the cleaning means 25 and permits the reverse flow of fluid from the outlet chamber 17 through the filter elements 29 and out through the rotatable arm 41, sleeve 40 and pipe 54 of said cleaning means. Simultaneously, the gearmotor imparts rotation to the stub shaft 61, its cam 62 and the shaft 26 to turn the cleaning arm and successively register its nipples 51 with the partition openings 31. The differential pressure regulator 53 prevents this reverse flow in the event that the pressure differential between the outlet chamber and discharge passage becomes excessive. As has been explained, however, reverse flow is permitted and recurs whenever the pressure differential is not excessive. The switch remains closed, the solenoid valve open and the gearmotor continues to rotate the cleaning arm 41 until the filter elements are cleansed and the pressure differential between the inlet and outlet chambers returns to balance or normal.

In fact, the operation of the cleaning means 25 ceases only when the pressure in the outlet chamber 17 becomes sufficient to overcome the inlet chamber pressure within the bellows 83, in coaction with the force of the spring 81, thereby collapsing said bellows and seating the valve plate 79 on the orifice 77 of the conductor 76. The fluid in the latter conductor bleeds through the vent 78 so as to relieve the pressure in the cylinder 68 and permit the spring 88 to lower the piston 87 and its rod 89. Due to the slidable mounting of the piston rod in the guide 91, the switch arm 90 remains in its on position until the lobe 96 of the cam 62 engages and depresses the cam rod 94 sufficiently to compress the spring 97 and pivot said arm downwardly to its off position. Usually, this occurs after one complete revolution of the cam; however, it is necessary for the piston to be in its lower position as shown in FIG. 7. If the piston 87 is held in its upper position (FIG. 8) by the continued flow of pressure fluid from the outlet chamber to the cylinder, due to the filter elements 29 requiring additional cleansing, downward pivoting of the switch arm to its off position is prevented by the engagement of the cotter pin 92 with the underside of the guide 91 whereby the depressing of the cam rod merely compresses its spring.

When the switch 63 is opened, the gearmotor 60 stops rotating the cleaning arm 41 and the solenoid valve 64 is actuated to shut off the flow of pressure fluid from the outlet chamber 17 through the conductors 69 and 71 to the motor valve 73 and to place said conductor 71 in communication with the vent 74. This permits the exhaust of the pressure exerted against the inner side of the diaphragm 72 and inward flexing of said diaphragm by the spring 75 to close the motor valve and stop the reverse flow of fluid from the outlet chamber through the filter elements and the discharge passage of the cleaning means. The full cycle of operation of the cleaning means is now complete and said means remains inoperative until the pressure differential between the inlet and outlet chambers 16 and 17 again exceeds the desired predetermined amount due to clogging of the filter elements.

As shown in FIGS. 13–18, the pressure of the fluid flowing through the vessel 10 may be utilized to operate the cleaning means 25 as well as control the operation of said means. A stub shaft 102, similar to the stub shaft 61, is detachably connected to the shaft 26 of the cleaning means and projects externally through the stuffing box 24 of the head 22 for supporting a pinion 103 in engagement with an upright, reciprocal gear rack 104 which is suspended from the lower end of a piston rod 105 (FIG. 13). The gear rack 104 is held in mesh with the pinion 103 by a guide roller 106 rotatably mounted on the head so as to bear against the side of said rack opposite and adjacent said pinion (FIG. 14). An upright cylinder 107, mounted on a plate or shelf 108 extending horizontally from the head 22, overlies the gear rack and has the piston rod 105 depending axially through its lower end from its piston 109 for reciprocating said gear rack and imparting rotation to the pinion, the shafts 102 and 26 and the cleaning arm 41. In addition to the cylinder 107, the shelf 108 is arranged to support a liquid reservoir 110 and a differential pressure regulator 111. A high pressure regulator 112, similar to the regulator 70 is connected in a fluid conductor 113 which extends from the head for supplying pressure fluid from the outlet chamber 17 to a pressure fluid cylinder 114 mounted axially on the cylinder 107. The cylinder 114 has a fluid conductor 115 extending therefrom to the diaphragm chamber 116 of a motor valve 117, identical to the motor valve 73 and connected to the discharge pipe 54 externally of the vessel for controlling flow through the discharge passage of the cleaning means (FIG. 13).

Although the upper end of the cylinder 107 is in open communication with the lower end of the pressure fluid cylinder 114, its piston 109 carries spaced seal rings 118 to prevent the pressure fluid from bypassing the piston (FIGS. 14 and 16). An axial rod or stem 119 extends upwardly from the piston through the cylinder 114 and has a helical spring 120 loosely confined on its lower portion above said piston. The upper portion of the stem 119 has a cylindrical valve 121, of the piston or sleeve type, slidably confined thereon and slidably disposed within the cylinder 114 to control the flow of pressure fluid through said cylinder. A spider 122 is provided at the lower end of the sleeve valve 121 to permit axial flow through said valve and to support a helical spring 123 which is loosely confined on the stem by nuts or other enlargements 124 on the upper end of the stem. For guiding the stem 119, an elongated housing or tube 125 upstands axially from a cap 126 which closes the upper end of the pressure fluid cylinder. As shown in FIGS. 15 and 17, the conductor 113 communicates with the lower portion of the cylinder 114, the conductor 115 with the medial portion thereof and a vent port 127 with the upper portion of said cylinder.

Since the sleeve valve is fully disclosed in my Patent No. 2,997,030, it is believed unnecessary to further describe the same; however, it is pointed out that the exterior of said valve is recessed circumferentially for constant communication with the conductor 115, communication with the conductor 113 in its lower position (FIG. 17) and with the vent port 127 in its upper position (FIG. 15) whereby said conductor 115 communicates with either said conductor 113 or said vent port. Also, the sleeve valve has its upper and lower ends sealed off from the cylinder wall and is adapted to be restrained in its upper and lower positions by detent means 128 to provide snap action of said valve.

From the conductor 115 which extends between the pressure fluid cylinder 114 and the motor valve 117, a fluid conductor 129 leads to the upper end of the liquid reservoir 110 (FIG. 18) whereby pressure fluid is supplied to the upper portion of said reservoir simultaneously with the application of pressure fluid to the diaphragm chamber 116 of said motor valve. The lower portion of the liquid reservoir communicates through a liquid conductor 130 with the longitudinal duct or passage 131 of an oblong, horizontal valve block or body 132 which is connected by a pair of upright conductors 133 and 134 to the longitudinal duct or passage 135 of an underlying, oblong block 136 resting on the shelf 108 (FIGS. 14 and 16). A liquid conductor 137 connects the lower end of the cylinder 107 to the medial portion of the duct 135 of the block 136.

The upright conductor 134 has a check valve 138 therein to prevent flow from the duct 135 to the duct 131 of the block 132, while a check valve 139 is mounted in the conductor 133 to prevent flow from said duct 131 to said duct 135. Downward flow through the conductor 134 between the ducts 131 and 135 is controlled by an adjustable metering valve 140 which is suitably mounted in the block 132 and may be of the type shown in my patent, supra. For controlling upward flow through the conductor 133, a valve element 141 is mounted in the block 132 and is adapted to be opened and closed by the differential pressure regulator 111 which has its diaphragm 142 fastened to the valve element by a rod or stem 143. The underside of the diaphragm 142 is exposed to the pressure of the fluid in the inlet chamber 16 through a fluid conductor 144. An overlying, helical spring 145 constantly urges the diaphragm downwardly and is aided by the pressure of the fluid in the outlet chamber 17 which communicates with the upper side of said diaphragm through a conductor 146, whereby the valve element is held closed or seated until the pressure in the inlet chamber exceeds the combined force of the spring 145 and the pressure in the outlet chamber.

During normal operation of the fluid filter shown in FIGS. 13–18, the valve element 141 is seated and the piston 109 and sleeve valve 121 are in their upper positions (FIG. 14). Although the pressure fluid in the outlet chamber 17 flows through the high pressure regulator 112, conductor 113 and pressure fluid cylinder 114 below the sleeve valve and into the upper portion of the cylinder 107, the piston cannot move downwardly due to the liquid in said cylinder below said piston being prevented from escaping by the check valve 138 and the seated valve element. When the pressure differential between the inlet and outlet chambers exceeds a predetermined setting of the spring 145, the greater pressure of the fluid in the inlet chamber 16 and conductor 144 flexes the diaphragm 142 upwardly to unseat the valve element 141 and permit the pressure fluid in the upper portion of the cylinder 107 to force the piston 109 downwardly. The liquid below the piston flows through the conductor 137, duct 135, upright conductor 133, upwardly opening check valve 139, duct 131 and conductor 130 into the liquid reservoir 110, thereby permitting said piston to move to its lower position (FIG. 16). Due to the communication of the conductor 115 with the vent port 127 as shown in FIG. 15, the pressure of the fluid within the reservoir is relieved through the conductor 129 so as to not interfere with the entry of the liquid into said reservoir.

When the piston reaches the bottom of the cylinder, the enlargement 124 on the upper end of the stem 119 engages and compresses the spring 123 to snap the sleeve valve 121 downwardly to its lower position. As shown in FIG. 17, this position of the sleeve valve prevents the flow of pressure fluid from the cylinder 114 to the cylinder 107; however, the fluid in said cylinder 107 above its piston 109 may flow axially through said sleeve valve to the vent port 127 which is uncovered. Also, communication between the conductors 113 and 115 is established to permit the pressure fluid to flow around the sleeve valve and to the diaphragm chamber 116 of the motor valve 117 for opening said valve and allowing the reverse flow of fluid from the outlet chamber through the filter elements 29 and the discharge passage of the cleaning means 25.

Since the conductor 129 is connected to the conductor 115, the pressure fluid flowing around the sleeve valve 121 in the cylinder 114 also enters the upper portion of the reservoir 110 which now contains its maximum liquid level. The fluid entering the reservoir forces the liquid through the conductor 130 and the duct 131 of the block 132 into the upright conductor 134 past the metering valve 140. Manifestly, the setting of the latter valve controls the rate of fluid flow from the reservoir 110 and downward flow through the conductor 134 is permitted by the downwardly-opening check valve 138. After passing through the duct 135 of the block 136 and the conductor 137, the liquid reenters the cylinder 107 to force its piston 109 upwardly and the pressure fluid above said piston is exhausted to atmosphere through the vent port 127.

Since the gear rack 104 is suspended from the piston rod 105, the reciprocal movement of the piston causes said gear rack to rotate the pinion 103, the shafts 102 and 26 and the arm 41 of the cleaning means. The flow rate of the liquid from the reservoir to the cylinder 107 being controlled by the metering valve 140, said liquid flow rate has a direct bearing on the rotation of the cleaning arm whereby the rate of rotation of said arm is controlled by said metering valve to provide adequate cleaning of the filter elements 29. During the upward movement of the piston 109, the motor valve 117 remains open to permit flow through the discharge passage of the cleaning means.

When the filter elements are sufficiently clean to return the pressure differential between the inlet and outlet chambers 16 and 17 to balance or normal, the valve element 141 is seated by downward flexing of the diaphragm 142 of the pressure differential regulator 111. At this time, the piston 109 has reached its upper position and the spring 120 is compressed between said piston and the sleeve valve 21 and snaps said valve upwardly to its upper position. As shown in FIG. 15, this position of the sleeve valve prevents the pressure fluid from entering the conductor 115 as well as the conductor 129 and the motor valve 117 is closed so as to prevent flow through the discharge passage of the cleaning means 25. Since the conductor 115 is in communication with the vent port 127, the pressure fluid within the diaphragm chamber 116 of the motor valve is exhausted to atmosphere to permit closing of said valve. Also, the pressure of the fluid within the reservoir is relieved through the vent port. The filtering operation now resumes and continues until the pressure differential between the inlet and outlet chambers again exceeds the predetermined limit.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A self-cleaning pressure fluid filter including a vessel having an inlet chamber and an outlet chamber, partition means separating the inlet and outlet chambers, a plurality of filter elements in the outlet chamber and having inlet ends which communicate with said inlet chamber through the partition means whereby fluid under pressure flowing through the vessel is forced through the filter elements, cleaning means rotatably mounted in said vessel and having a discharge passage for communicating with the inlet ends of said filter elements upon rotation of the cleaning means to permit fluid from said outlet chamber to flow in a reverse direction through said elements into the discharge passage, means for rotating said cleaning means, and means responsive to the differential in pressures of the fluid in said outlet chamber and passage for preventing flow through said discharge passage when the pressure differential exceeds a predetermined amount so as to preclude damaging of said filter elements, the differential pressure responsive means including valve means for controlling flow through said discharge passage and pressure sensitive means exposed to the pressure of the fluid in said outlet chamber for imparting closing movement to the valve means and exposed to the pressure of the fluid in said discharge passage for imparting opening movement to said valve means and means for holding said valve means open until the differential between the fluid pressures in said outlet chamber and passage exceeds a predetermined amount.

2. A self-cleaning pressure fluid filter as set forth in claim 1 wherein the pressure sensitive means includes a diaphragm.

3. A self-cleaning pressure fluid filter as set forth in claim 1 wherein the means for holding the valve means open includes a spring.

4. A self-cleaning pressure fluid filter as set forth in claim 3 wherein the pressure sensitive means includes a diaphragm.

5. A self-cleaning pressure fluid filter as set forth in claim 1 wherein the means for rotating rotates said cleaning means about an axis in a plane transverse to the partition means and said cleaning means includes a member in the inlet chamber extending laterally of the axis of rotation of said cleaning means adjacent said partition means, the member having a portion of the discharge passage formed therein and a plurality of openings spaced longitudinally thereof for establishing communication between said discharge passage and the inlet ends of the filter elements, the openings of said member being adapted to move through concentric arcs about said axis of rotation, said filter elements being disposed in close proximity to one another with their inlet ends in the arcs of movement of said openings for successive registration therewith, and means extending transversely from said member adjacent each opening for overlying said inlet ends of said elements in the arc of movement of the opening whereby the bypassing of fluid from said inlet chamber through a partially registered opening and inlet end is minimized.

6. A self-cleaning pressure fluid filter including a vessel having an inlet chamber and an outlet chamber, partition means separating the inlet and outlet chambers, a plurality of filter elements in the outlet chamber and having inlet ends which communicate with said inlet chamber through the partition means whereby fluid under pressure flowing through the vessel is forced through the filter elements, cleaning means rotatably mounted in said vessel and having a discharge passage for communicating with the inlet ends of said filter elements upon rotation of the cleaning means to permit fluid from said outlet chamber to flow in a reverse direction through said elements into the discharge passage, means for rotating said cleaning means, and a pressure differential regulator including valve means for controlling flow through said discharge passage and pressure responsive means exposed to the pressure of the fluid in said outlet chamber for imparting closing movement to the valve means and exposed to the pressure of the fluid in said discharge passage for imparting opening movement to said valve means and means for holding said valve open until the differential between the fluid pressures in said outlet chamber and passage exceeds a predetermined amount.

7. A self-cleaning pressure fluid filter as set forth in claim 6 wherein the pressure responsive means includes a diaphragm.

8. A self-cleaning pressure fluid filter as set forth in claim 6 wherein the means for holding the valve means open includes a spring.

9. A self-cleaning pressure fluid filter as set forth in claim 8 wherein the pressure responsive means includes a diaphragm.

References Cited by the Examiner

UNITED STATES PATENTS

| | | | |
|---|---|---|---|
| 540,720 | 6/1895 | Clark | 55—302 X |
| 2,237,964 | 4/1941 | Haught | 210—108 X |
| 2,296,247 | 9/1942 | Green | 210—137 X |
| 2,731,107 | 1/1956 | Hersey | 55—302 X |
| 2,980,207 | 4/1961 | Allen | 55—302 X |
| 3,168,467 | 2/1965 | Dreyer | 210—108 |
| 3,176,846 | 4/1965 | Adams | 55—302 X |
| 3,228,528 | 1/1966 | Mummert et al. | 210—333 |

REUBEN FRIEDMAN, *Primary Examiner.*

D. M. RIESS, *Assistant Examiner.*